US008726237B2

(12) United States Patent
Van Ness et al.

(10) Patent No.: US 8,726,237 B2
(45) Date of Patent: May 13, 2014

(54) EVENT HANDLING FOR UNMANAGED CODE

(75) Inventors: Shawn Van Ness, Renton, WA (US); Paul Kwiatkowski, Redmond, WA (US); Nikhil Dang, Redmond, WA (US); Martyn Lovell, Seattle, WA (US); Benjamin Constable, Redmond, WA (US); Gary Henderson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 12/607,861

(22) Filed: Oct. 28, 2009

(65) Prior Publication Data

US 2011/0099537 A1    Apr. 28, 2011

(51) Int. Cl.
*G06F 9/44*  (2006.01)
(52) U.S. Cl.
USPC .......................................... 717/120; 707/813
(58) Field of Classification Search
None
See application file for complete search history.

(56) References Cited

U.S. PATENT DOCUMENTS

| | | | |
|---|---|---|---|
| 5,828,882 A | 10/1998 | Hinckley | |
| 5,925,108 A | 7/1999 | Johnson et al. | |
| 7,177,925 B2 | 2/2007 | Corcido et al. | |
| 7,418,715 B2 | 8/2008 | Pereira | |
| 7,519,976 B2 | 4/2009 | Blevens | |
| 2001/0039609 A1* | 11/2001 | Houldsworth | 711/170 |
| 2004/0168150 A1* | 8/2004 | Ziv | 717/116 |
| 2006/0101412 A1* | 5/2006 | Lev et al. | 717/127 |
| 2006/0259528 A1* | 11/2006 | Dussud et al. | 707/206 |
| 2009/0150465 A1* | 6/2009 | Branda et al. | 707/206 |
| 2010/0114999 A1* | 5/2010 | Qi | 707/816 |
| 2012/0066193 A1* | 3/2012 | King et al. | 707/704 |

OTHER PUBLICATIONS

"Consuming Events", InformIT: .NET Reference Guide, 2009, reprinted from the Internet at: http://www.informit.com/guides/content.aspx?g=dotnet&seqNum=184, 9 pgs.
"Review Visible Event Handlers", Visual Studio Team System, 2009, reprinted from the Internet at: http://msdn.microsoft.com/en-us/library/ms182312.aspx, 2 pgs.
"WeakEvent Patterns", Windows Presentation Foundation, 2009, reprinted from the Internet at: http://msdn.microsoft.com/en-us/library/aa970850.aspx, 3 pgs.
"Handling CO< Events in ATL", Programing ArcGIS in Visual C++, 2009, reprinted from the Internet at: http://resources.esri.com/help/9.3/arcgisdesktop.com/COM/VCpp/Events.htm, 7 pgs.

* cited by examiner

*Primary Examiner* — Elias Mamo
(74) *Attorney, Agent, or Firm* — Tony Azure; Andrew Sanders; Micky Minhas

(57) ABSTRACT

Many computer applications involve event driven programming. Unfortunately, it may be burdensome on application developers to develop event handlers in unmanaged code for all relevant events within their computer application. For example, when using COM objects in connection with event handling, the burden of lifetime management may be placed on the application developer. Accordingly, one or more systems and/or techniques for event handling in unmanaged code are disclosed herein. A delegate comprising a first interface and a second interface is provided. The delegate may receive event data from a software platform connected to the first interface and may notify a function of a process connected to the second interface. The delegate self destructs when both the computing platform and the process have released their connections to the respective interfaces, thus mitigating manual coding of lifetime management functionality within the process.

20 Claims, 8 Drawing Sheets

EVENT HANDLING FOR UNMANAGED CODE

BACKGROUND

Today, many applications, such as graphical user interface (GUI) programs and web applications, are event driven. A user may click a button or scroll within a window of an application, setting off a MouseClick event or a MouseScroll event within the application, for example. To facilitate developing these event driven applications, many application programming interfaces support event handlers. Event handlers allow developers to write functionality that executes in response to events. For example, a calculator application may be configured to execute an addition operation in response to a MouseClick event on an Addition Button within the calculator application. Unfortunately, programming event handlers can be burdensome in unmanaged code (e.g., a platform that does not support garbage collection, C++ utilizing Component Object Module (COM), etc.). That is, an application may support hundreds of different events, such that corresponding event handlers may each have many lines of code simply devoted to lifetime management. Thus, while utilizing event handlers can be a convenient and intuitive scheme to conceptualize programming, developing and executing event handlers in unmanaged code can be resource intensive.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for event handling in unmanaged code (e.g., a programming language with minimal garbage collection) is disclosed herein. A delegate may be configured to expose a first interface to which a software platform (e.g., a user interface platform, a web browsing platform, etc.) may connect. In one example, a delegate may be a COM object component with one or more interfaces. The delegate may be configured to maintain a first independent reference count associated with the software platform. It may be appreciated that the first independent reference count may be used in determining whether the software platform is connected to or has released from the first interface. The delegate may be configured to expose a second interface to which a process (e.g., a user interface application written in unmanaged code or a portion thereof) may connect. The delegate may be configured to maintain a second independent reference count associated with the process. It may be appreciated that the second independent reference count may be used in determining whether the process is connected to or has released from the second interface.

The delegate may be configured to self destruct (e.g., release from memory) when both the first independent reference count indicates the software platform released a first connection to the first interface (e.g., the first independent reference count is zero) and the second independent reference count indicates the process released a second connection to the second interface (e.g., the second independent reference count is zero). That is, the delegate may be active if at least one of the software platform and the process is connected to the delegate, so that the delegate exists to mitigate the chance of bad pointers. If both the software platform and the process are not connected, then the delegate self destructs to free up memory. In this way, the delegate mitigates the need for manual coding of lifetime management of memory and objects that an application author would otherwise have to provide for every event handler.

The delegate may be configured through the first connection to receive event data from the software platform. It may be appreciated that in one example, the event data may be a notification of an event firing. In another example, the event data may comprise additional information regarding the firing of an event, such as, event arguments. For example, event data may be data associated with a MouseOver event that is wrapped in a COM object. The delegate may be configured through the second connection to notify a function (e.g., an event handler within the process) of the event data. This allows the function to execute code to handle the event data (e.g., highlight a button that the mouse was positioned over). Because the delegate is performing lifetime management of memory and objects (e.g., adhering to the guidelines of COM), the event handlers do not need manual programming of this functionality.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
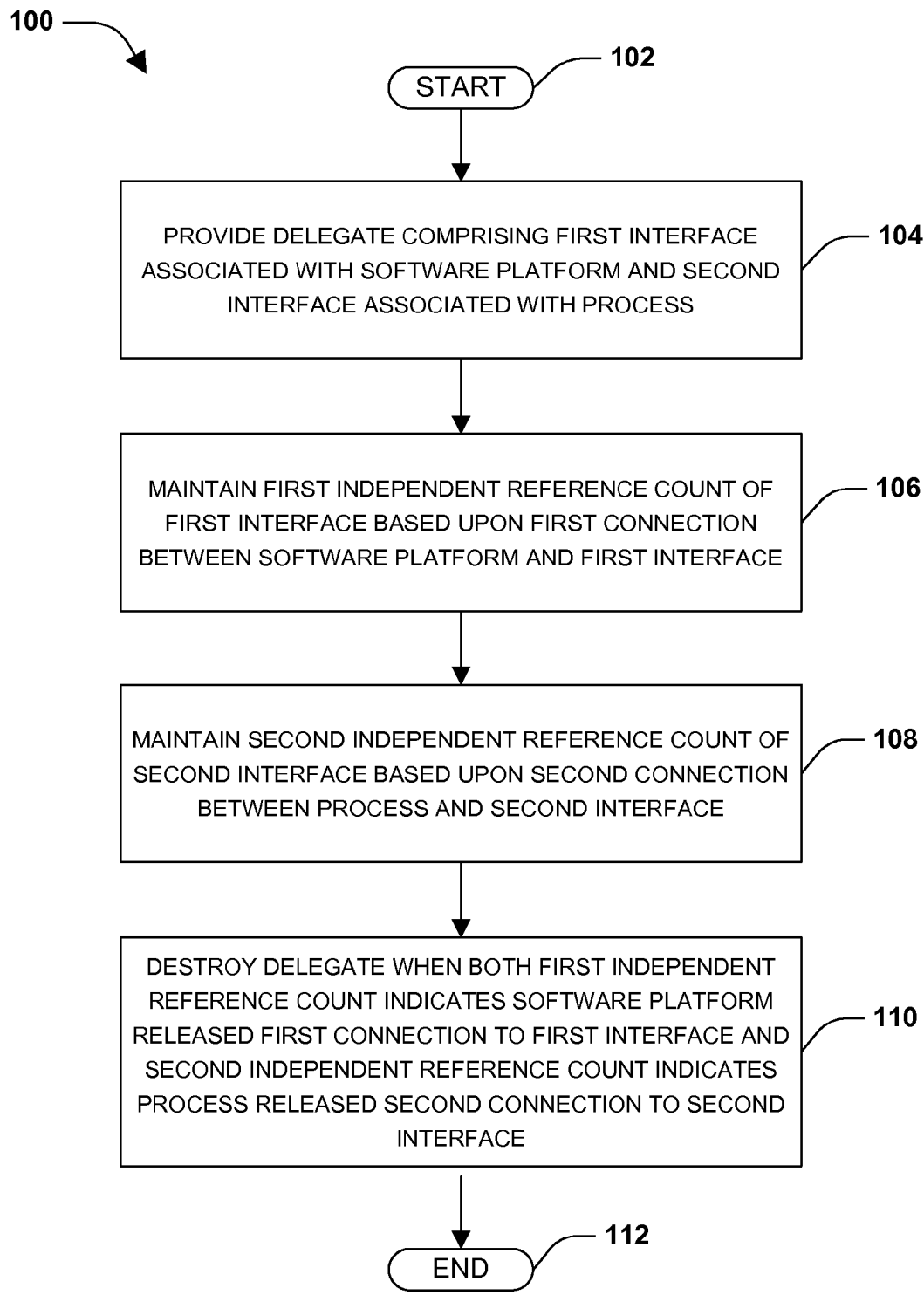
FIG. 1 is a flow chart illustrating an exemplary method of event handling in unmanaged code.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Event handling is germane to user interface programming. When a user interacts within a user interface application (e.g., moves the mouse, clicks buttons, scrolls the window, etc.), events (e.g., mouse click event, button down event, scroll event, etc.) occur. Usually, the user interface application is programmed to respond to events (as opposed to executing code the entire duration of the user interface's life without regard to events occurring) using event handlers. This provides a robust and interactive experience for the user, and a practical and intuitive scheme for programming.

Many of these event driven applications are developed using unmanaged code (e.g., C and/or C++ programs compiled into machine language for particular platforms). Unfortunately, unmanaged code, such as C++, is limited in its ability to communicate across boundaries (e.g., communication between a music player application and an operating system or web browsing platform). To facilitate communication for these applications derived from unmanaged code, Component Object Module (COM) was created to, among other things, facilitate the communication across these barriers. Thus, many application program interfaces are COM based. One benefit of COM is that it has a robust functionality for managing lifetime of memory and objects to minimize memory leaks. By the same token, however, it can become tedious and burdensome to program event handlers because a single event handler takes many lines of code to create the appropriate COM object for that particular event handler. This does not scale well when many applications comprise hundreds of events with corresponding event handlers.

Accordingly, one or more systems and/or techniques for event handling in unmanaged code are provided herein. A delegate may be provided to mitigate the burden on an application developer of managing the lifetime of an application object (e.g., memory, handles, etc.), which would otherwise be placed upon the application developer when utilizing COM. In one non-limiting example, the delegate may be implemented as a two-headed COM object. That is, the delegate may comprise a first interface to which a software platform may connect and a second interface to which a process (e.g., an application or a portion thereof) may connect. The delegate may be configured to receive event data from the software platform and notify an appropriate function (e.g., an event handler of a user interface application) specified by the process of the event data. Furthermore, the delegate may be configured to self destruct upon both the software platform and the process releasing their connections to the delegate, otherwise the delegate may remain active in memory to mitigate chances of bad pointers where either the software platform released and the process is still connected or visa versa.

One embodiment of event handling in unmanaged code is illustrated by an exemplary method 100 in FIG. 1. At 102, the method begins. At 104, a delegate comprising a first interface associated with a software platform and a second interface associated with a process is provided. The software platform may connect to the first interface, allowing the delegate to receive event data from the software platform. The process may connect to the second interface, allowing the delegate to notify a function (e.g., an event handler) specified by the process of the event data. It may be appreciated that a pointer from the delegate to the process may also be used to notify the function of the event data. In one example, the event data may be wrapped within a query enabled COM object.

At 106, a first independent reference count of the first interface may be maintained based upon a first connection between the software platform and the first interface. That is, the first independent reference count specifies whether the first connection to the first interface exists (e.g., the first independent reference count is a positive integer) or has been released (e.g., the first independent reference count is decremented to zero) by the software platform. At 108, a second independent reference count of the second interface may be maintained based upon a second connection between the process and the second interface. That is, the second independent reference count specifies whether the second connection to the second interface exists (e.g., the second independent reference count is a positive integer) or has been released (e.g., the second independent reference count is decremented to zero) by the process. If a pointer was created from the delegate to the process, then the pointer may cease to exist or be destroyed when the process releases the second connection to the second interface.

It may be appreciated that the delegate may remain in memory when the first connection exists and the second connection is released, thus mitigating the chance of bad pointers from the software platform to the disconnected process. It may be appreciated that the delegate may remain in memory when the first connection is released and the second connection exists, thus mitigating the chance of bad pointers from the process to the disconnected software platform.

At 110, the delegate is destroyed when both the first independent reference count indicates the software platform released the first connection to the first interface (e.g., the first independent reference count is zero) and the second independent reference count indicates the process released the second connection to the second interface (e.g., the second independent reference count is zero). This allows safe removal of the delegate from memory without leaving bad pointers because both the software platform and the process have disconnected. At 112, the method ends.

Figure 2:
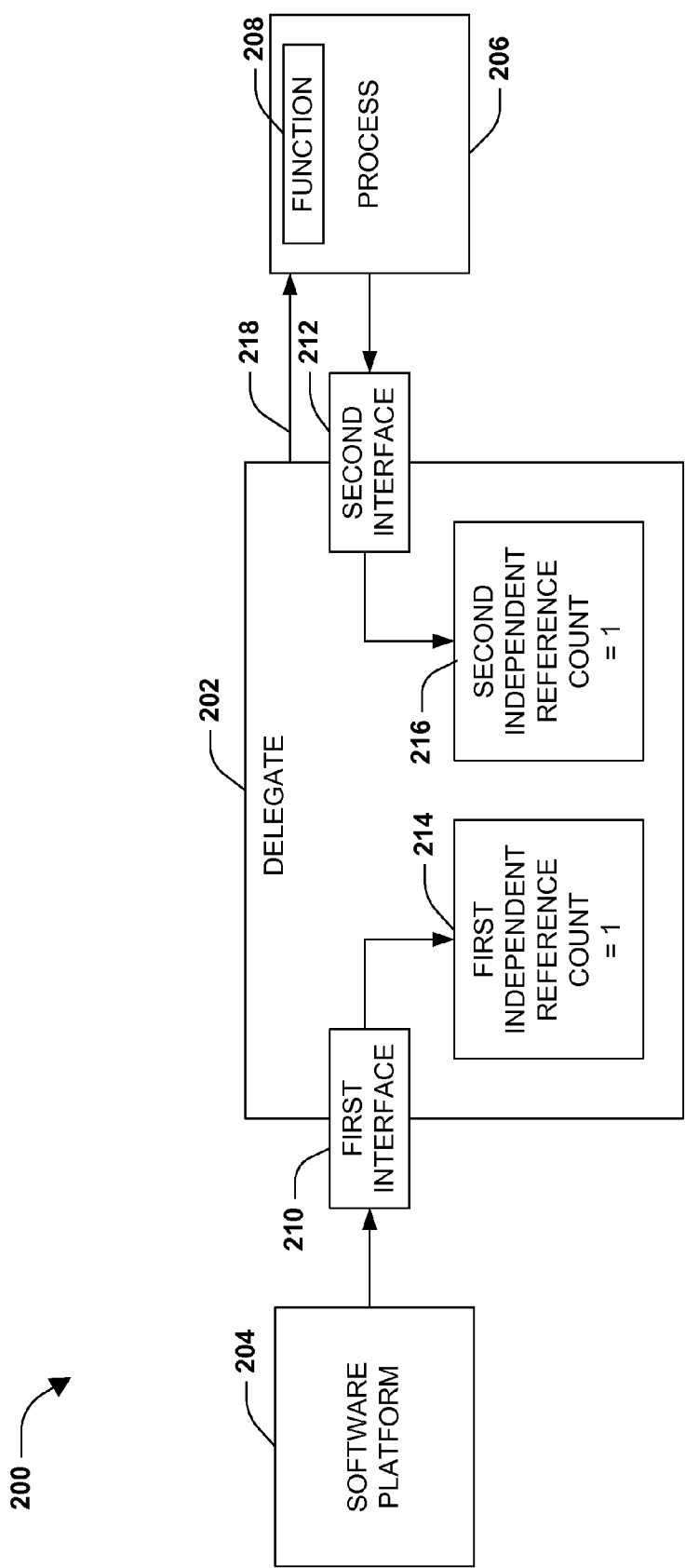
FIG. 2 is a component block diagram illustrating an exemplary system for event handling in unmanaged code.

FIG. 2 illustrates an example of a system 200 configured for event handling in unmanaged code. The system 200 may comprise a delegate 202 configured to expose a first interface 210 and a second interface 212. A software platform 204 (e.g., a user interface platform, data received through a network, etc.) may establish a first connection to the first interface 210. It may be appreciated that the delegate 202 may receive event data from the software platform 204 through the first interface 210. The delegate 202, through the first interface 210, may be configured to maintain a first independent reference count 214 associated with the software platform 204. That is, the first independent reference count 214 may be specified to indicate whether the first connection to the first interface 210 exists (e.g., the first independent reference count 214 is a positive integer such as 1) or has been released (e.g., the first independent reference count 214 is decremented to zero) by the software platform 204.

A process 206 may establish a second connection to the second interface 212. It may be appreciated that the delegate 202 may notify a function 208 specified by the process 206 of event data through the second interface 212 and/or through a pointer 218. The delegate 202, through the second interface 212, may be configured to maintain a second independent reference count 216 associated with the process 206. That is, the second independent reference count 216 may be specified to indicate whether the second connection to the second interface 212 exists (e.g., the second independent reference count 216 is a positive integer such as 1) or has been released (e.g., the second independent reference count 216 is decremented to zero) by the process 206.

The delegate 202 may be configured to self destruct (e.g., be erased from memory) when both the first independent reference count 214 indicates the software platform 204 released the first connection to the first interface 210 and the second independent reference count 216 indicates the process 206 released a second connection to the second interface 212. This allows the delegate to safely remove itself from memory without leaving bad pointers.

The delegate 202 may be configured to address versioning. That is, event data passed from the software platform 204 through the delegate 202 to the function 208 may be wrapped within a COM object comprising event arguments. The event arguments may be queried through multiple interfaces. The delegate 202 may allow for registration of distinct event handlers for distinct argument interfaces. It may be appreciated that in an alternative example, the software platform 204 may allow for multiple delegates to be registered for distinct argument interfaces. For example the delegate 202 may support registration of one or more versions of the function 208. Based upon the registration, the delegate may select an appropriate second interface when an event fires. The delegate 202 may be configured to address run-time type verification. For example, the delegate 202 may leverage a QueryInterface functionality within COM to provide run-time type verification. The delegate 202 may be configured to provide templates for registering functions as event handlers in a manner appropriate for cross-binary calls.

Figure 3:
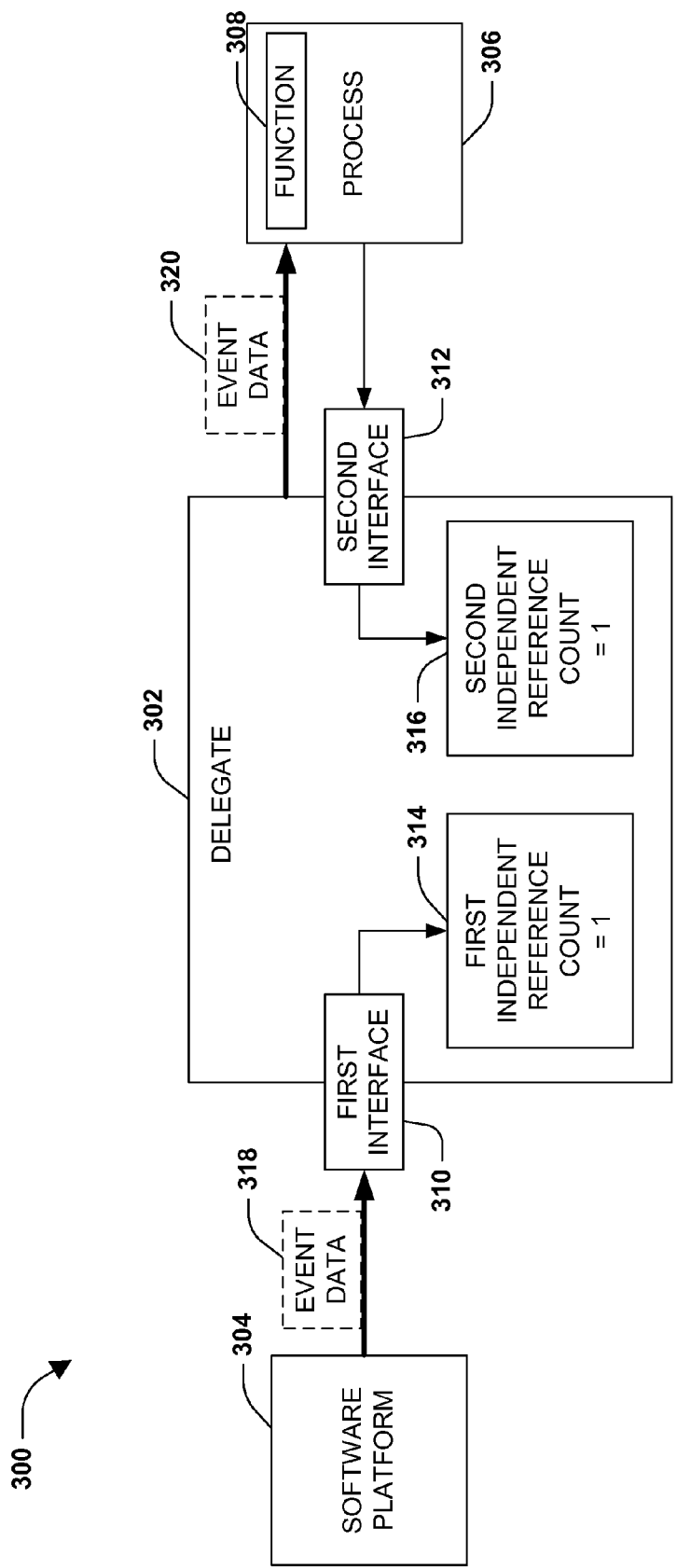
FIG. 3 is an illustration of an example of event handling in unmanaged code.

FIG. 3 illustrates an example of a system 300 configured for event handling in unmanaged code. The system 300 comprises a delegate 302. The delegate 302 may comprise a first interface 310 to which a software platform 304 (e.g., a user interface platform, an operating system, a web browsing platform, etc.) may establish a first connection. The delegate 302 may comprise a second interface 312 to which a process 306 (e.g., a paint application or a portion thereof, a music application or a portion thereof, a web browser plug-in or a portion thereof, etc.) may establish a second connection. The delegate 302 may be configured to monitor the first connection between the software platform 304 and the first interface 310 using a first independent reference count 314. The delegate 302 may be configured to monitor the second connection between the process 306 and the second interface 312 using a second independent reference count 316.

In one example, a web browsing platform (e.g., the software platform 304) may establish the first connection to the delegate 302 and a video player web application (e.g., the process 306) may establish the second connection to the delegate 302. While the first connection exists (the web browsing platform is connected to the first interface 310), the delegate 302 may be configured to keep a positive integer value within the first independent reference count 314 (e.g., 1). While the second connection exists (the video player web application is connected to the second interface 312), the delegate may be configured to keep a positive integer value within the second independent reference count 316 (e.g., 1) and a pointer to an OnButtonClickEventHandler function (e.g., a function 308) specified by the video player web application.

The first independent reference count=1 indicates to the delegate 302 that the web browsing platform is connected and may possibly send event data 318 through the first interface 310. The second independent reference count=1 indicates to the delegate 302 that the video player web application is connected and is ready to receive event data 320 through the pointer to the OnButtonClickEventHandler function. The delegate 302 may be configured to receive the event data 318 (e.g., a ButtonClickEvent along with arguments wrapped in a COM object) from the web browsing platform and send the event data 320 (e.g., a ButtonClickEvent along with arguments wrapped in a COM object) to the OnButtonClickEventHandler function when both the first independent reference count 314 and the second independent reference count 316 are positive integer values, indicating the respective connections exist.

Figure 4:
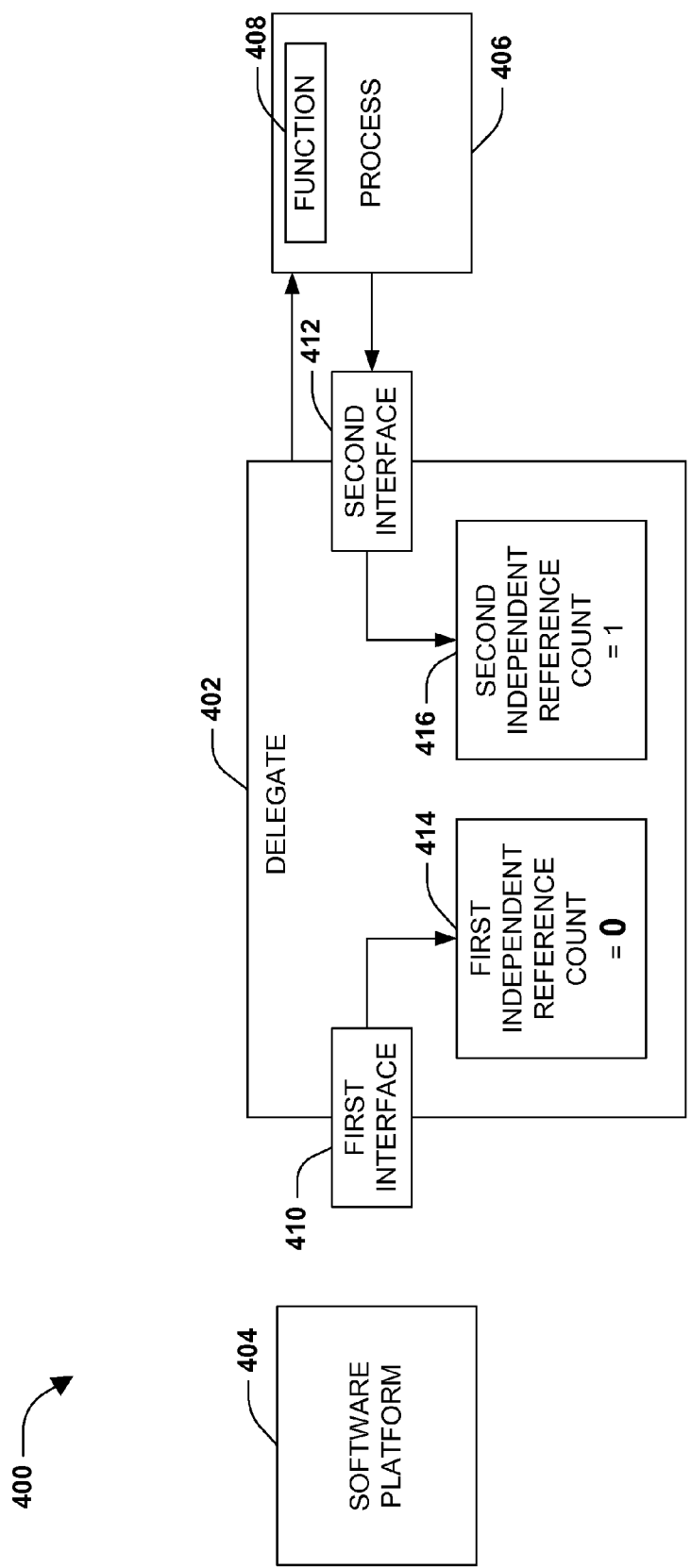
FIG. 4 is an illustration of an example of a system configured to facilitate event handling in unmanaged code.

FIG. 4 illustrates an example of a system 400 configured to manage event handling in unmanaged code. The system 400 comprises a delegate 402. The delegate 402 may comprise a first interface 410 to which a software platform 404 may establish a first connection. The delegate 402 may comprise a second interface 412 to which a process 406 may establish a second connection. The delegate 402 may be configured to monitor the first connection between the software platform 404 and the first interface 410 using a first independent reference count 414. The delegate 402 may be configured to monitor the second connection between the process 406 and the second interface 412 using a second independent reference count 416. The delegate 402 may be configured to receive event data from the software platform 404 through the first interface 410 and notify a function 408 specified by the process 406 of the event data, for example using a pointer.

In one example, a web browsing platform (e.g., the software platform 404) may establish the first connection to the delegate 402 and a video player web application (e.g., the process 406) may establish the second connection to the delegate 402. While the first connection exists (the web browsing platform is connected to the first interface 410), the delegate 402 may be configured to keep a positive integer value within the first independent reference count 414 (e.g., 1). While the second connection exists (the video player web application is connected to the second interface 412), the delegate may be configured to keep a positive integer value within the second independent reference count 416 (e.g., 1) and the pointer to an OnButtonClickEventHandler function (e.g., the function 408) specified by the video player web application.

In the example of FIG. 4, the web browsing platform has disconnected from the first interface 410. For example, the web browsing platform may have been shutdown, suspended, etc. Because there is no connection, the delegate 402 may write a zero (0) value, for example, to the first independent reference count 414 to indicate the web browsing platform has released the first connection. It may be appreciated that the delegate 402 will not receive event data from the web browsing platform because there is no connection. Even though the web browsing platform is disconnected, the video player web application is still connected to the second interface 412. Because the connection still exists, the second independent reference count 416 has a one (1) value and the delegate 402 does not self destruct (e.g., the delegate 402 remains operable and in memory).

Figure 5:
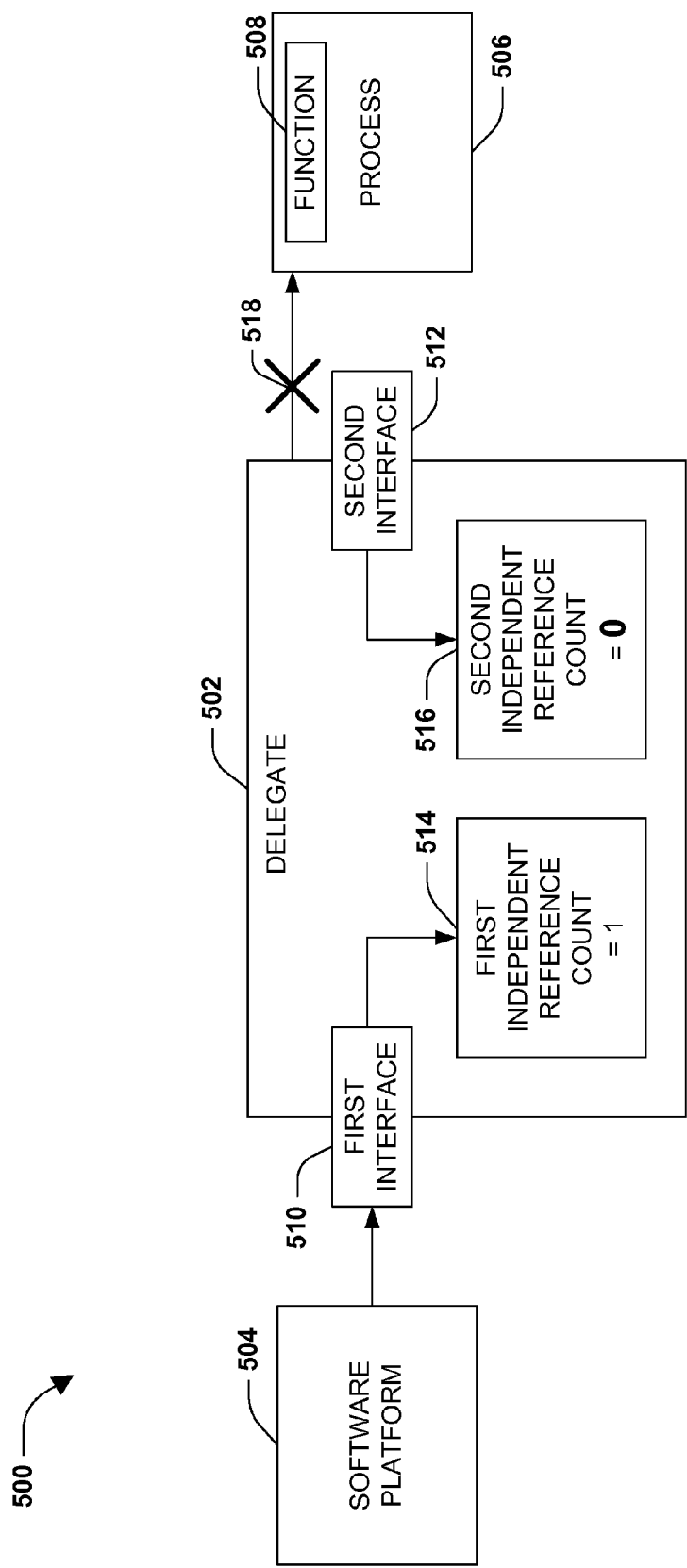
FIG. 5 is an illustration of an example of a system configured to facilitate event handling in unmanaged code.

FIG. 5 illustrates an example of a system 500 configured to manage event handling in unmanaged code. The system 500 comprises a delegate 502. The delegate 502 may comprise a first interface 510 to which a software platform 504 may establish a first connection. The delegate 502 may comprise a second interface 512 to which a process 506 may establish a second connection. The delegate 502 may be configured to monitor the first connection between the software platform 504 and the first interface 510 using a first independent reference count 514. The delegate 502 may be configured to monitor the second connection between the process 506 and the second interface 512 using a second independent reference count 516. The delegate 502 may be configured to receive event data from the software platform 504 through the first interface 510 and notify a function 508 specified by the process 506 of the event data, for example using a pointer 518.

In one example, a web browsing platform (e.g., the software platform 504) may establish the first connection to the delegate 502 and a video player web application (e.g., the process 506) may establish the second connection to the delegate 502. While the first connection exists (the web browsing platform is connected to the first interface 510), the delegate 502 may be configured to keep a positive integer value within the first independent reference count 514 (e.g., 1). While the second connection exists (the video player web application is connected to the second interface 512), the delegate may be configured to keep a positive integer value within the second independent reference count 516 (e.g., 1) and maintain the pointer 518 to an OnButtonClickEventHandler function (e.g., the function 508) specified by the video player web application.

In the example of FIG. 5, the video player web application has disconnected from the second interface 512. For example, the video player web application may have been shutdown, suspended, etc. Because there is no connection, the delegate 502 may write a zero (0) value, for example, to the second independent reference count 516 to indicate the video player web application has released the second connection. It may be appreciated that the delegate 502 may destroy the pointer 518 to the OnButtonClickEventHandler function because the video player web application is disconnected, thus preventing bad pointers. Even though the web video player application has disconnected from the second interface 512, the web browsing platform is still connected to the first interface 510. Because the first connection still exists, the first independent reference count 514 has a one (1) value and the delegate 502 does not self destruct (e.g., the delegate 502 remains operable and in memory).

Figure 6:
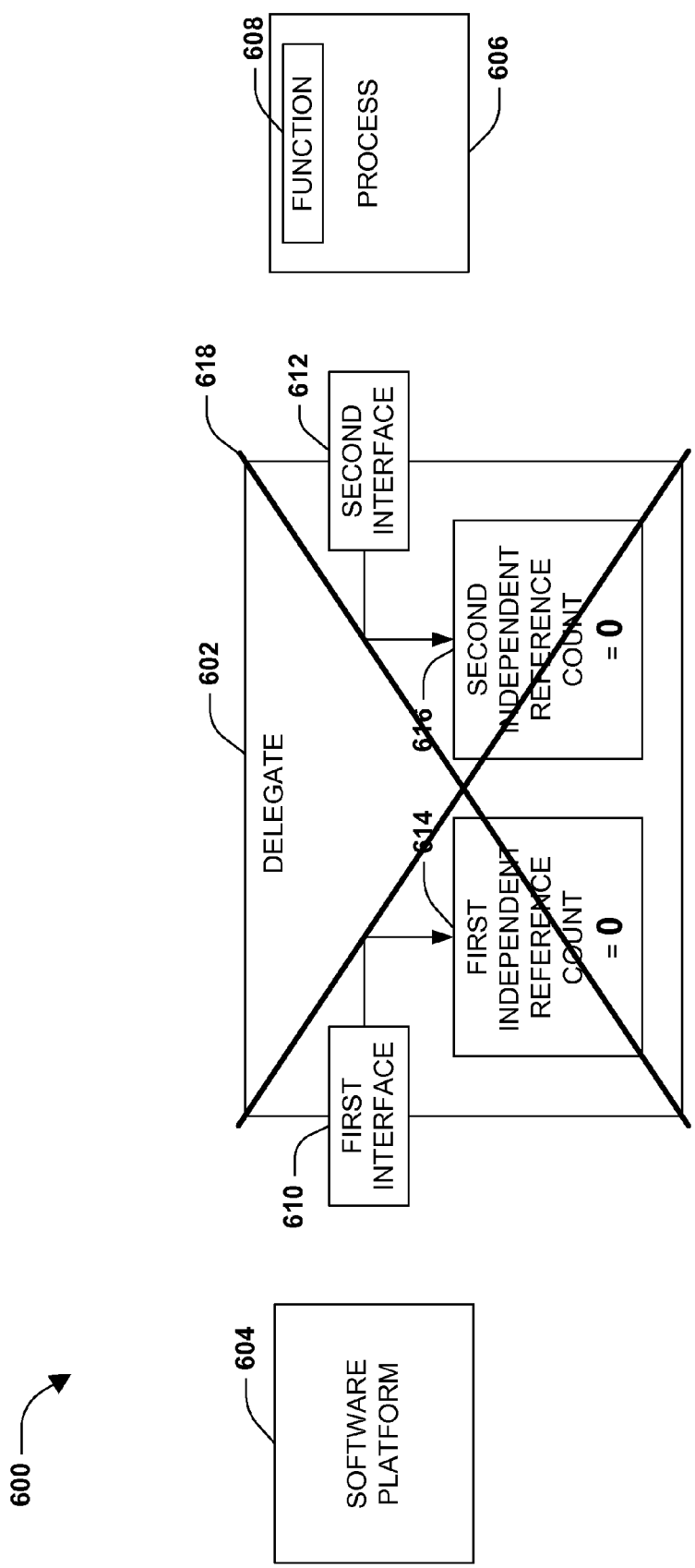
FIG. 6 is an illustration of an example of a system with a delegate configured to self destruct when a software platform is disconnected and a process is disconnected.

FIG. 6 illustrates an example of a system 600 configured to manage event handling in unmanaged code. The system 600 comprises a delegate 602. The delegate 602 may comprise a first interface 610 to which a software platform 604 may establish a first connection. The delegate 602 may comprise a second interface 612 to which a process 606 may establish a second connection. The delegate 602 may be configured to monitor the first connection between the software platform 604 and the first interface 610 using a first independent reference count 614. The delegate 602 may be configured to monitor the second connection between the process 606 and the second interface 612 using a second independent reference count 616. The delegate 602 may be configured to receive event data from the software platform 604 through the first interface 610 and notify a function 608 specified by the process 606 of the event data, for example using a pointer.

In one example, a web browsing platform (e.g., the software platform 604) may establish the first connection to the delegate 602 and a video player web application (e.g., the process 606) may establish the second connection to the delegate 602. While the first connection exists (the web browsing platform is connected to the first interface 610), the delegate 602 may be configured to keep a positive integer value within the first independent reference count 614 (e.g., 1). While the second connection exists (the video player web application is connected to the second interface 612), the delegate may be configured to keep a positive integer value within the second independent reference count 616 (e.g., 1) and maintain a pointer to an OnButtonClickEventHandler function (e.g., the function 608) specified by the video player web application.

In the example of FIG. 6, the web browsing platform has disconnected from the first interface 610 and thus the first independent reference count is zero (0). Also, the video player web application has disconnected from the second interface 612 and thus the second independent reference count is zero (0). Upon determining both the first independent reference count indicates the web browsing platform has released its connection to the first interface 610 and the second independent reference count indicates the video player web application has released its connection to the second interface 612, the delegate self destructs 618 (e.g., releases from memory).

Figure 7:
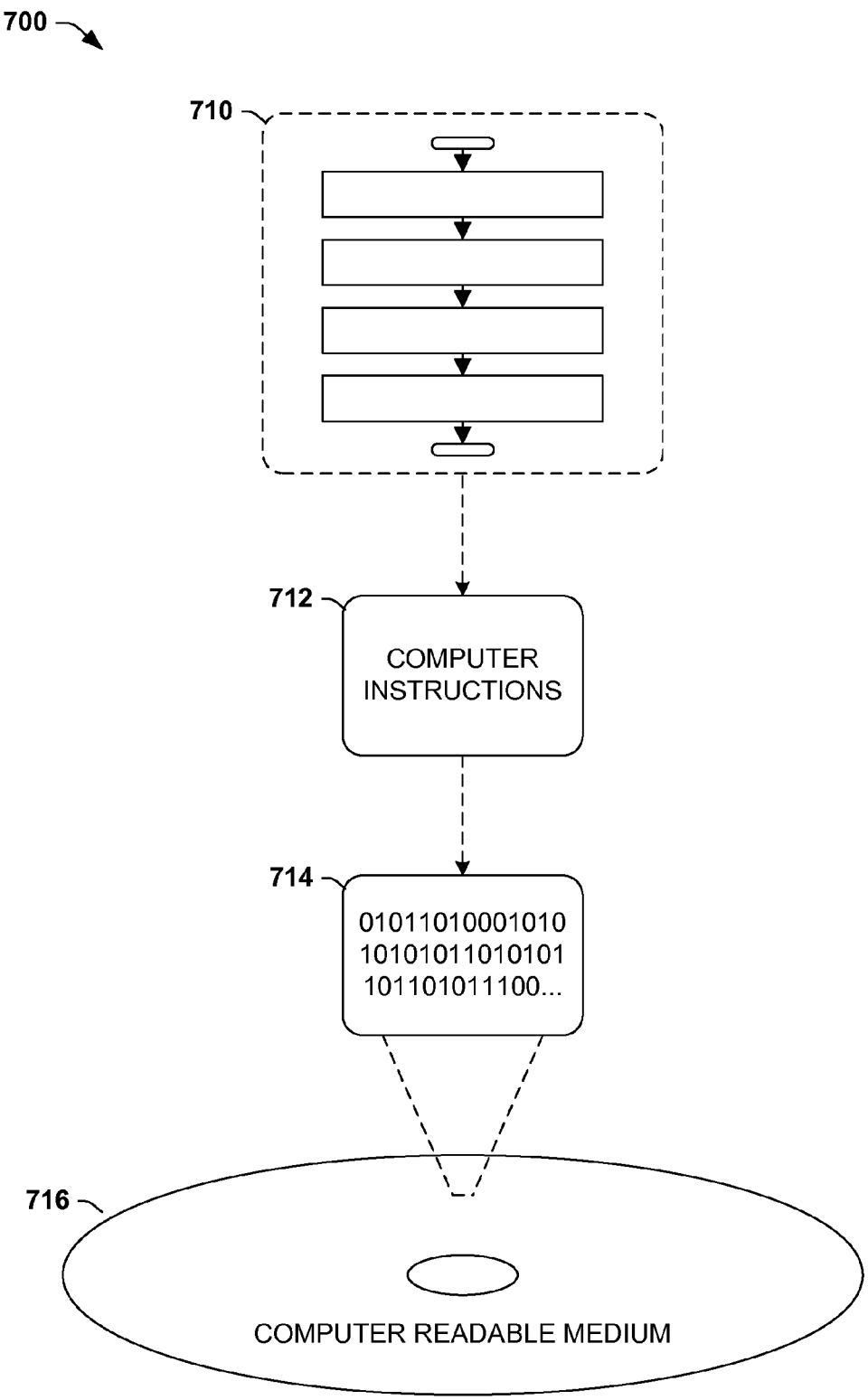
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable instructions 712 may be configured to perform a method 710, such as the exemplary method 100 of FIG. 1, for example. That is, the processor-executable instructions 712 may implement the exemplary methods 100 as an application program interface (API) which may be executed via one or more processors. In another such embodiment, the processor-executable instructions 712 may be configured to implement a system, such as the exemplary system 200 of FIG. 2, for example. Many such computer-readable media may be devised by those of ordinary skill in the art that are configured to operate in accordance with the techniques presented herein.

In one example, the method 710 may be configured to provide a delegate comprising a first interface associated with a software platform and a second interface associated with a process. The method 710 may be configured to maintain a first independent reference count of the first interface based upon a connection between the software platform and the first interface. The method 710 may be configured to maintain a second independent reference count of the second interface based upon a second connection between the process and the second interface. The method 710 may be configured to destroy the delegate when both the first independent reference count indicates the software platform released the first connection to the first interface and the second independent reference count indicates the process released a second connection to the second interface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
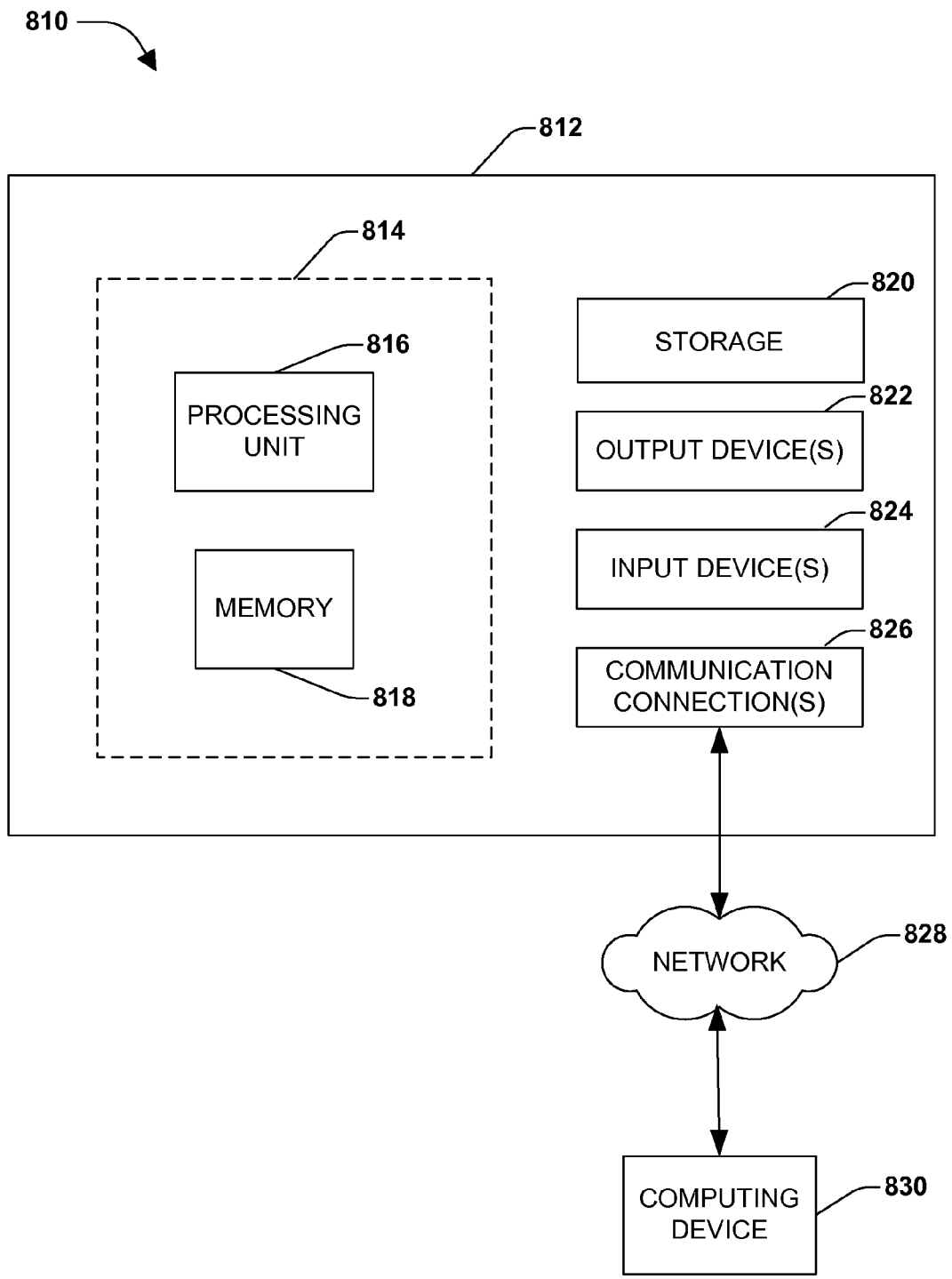
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, microprocessor, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for event handling in unmanaged code comprising:
   one or more processing units; and
   memory comprising instructions that when executed by at least one of the one or more processing units, implement at least some of:
   a delegate component connected to a software platform via a first interface, connected to a process via a second interface and configured to:
      expose the first interface, the first interface configured to maintain a first independent reference count associated with the software platform, the software platform comprising at least one of an operating system or a web browsing platform, the delegate component configured to receive event data from the software platform via the first interface;
      expose the second interface, the second interface configured to maintain a second independent reference count associated with the process; and
      self destruct when both the first independent reference count indicates the software platform released a first connection to the first interface and the second independent reference count indicates the process released a second connection to the second interface.

2. The system of claim 1, the software platform comprising the operating system.

3. The system of claim 1, the event data wrapped in a component object model (COM) object.

4. The system of claim 1, the delegate component configured to notify a function specified by the process of the event data via the second interface.

5. The system of claim 1, the delegate component configured to decrement the first independent reference count upon a determination that the software platform released the first connection to the first interface.

6. The system of claim 1, the delegate component configured to decrement the second independent reference count upon a determination that the process released the second connection to the second interface.

7. The system of claim 1, the first independent reference count configured to comprise a zero value to indicate the software platform released the first connection to the first interface and the second independent reference count configured to comprise a zero value to indicate the process released the second connection to the second interface.

8. The system of claim 4, the delegate component configured to:
   support registration of one or more versions of the function; and
   select the second interface based upon the registration.

9. The system of claim 1, the delegate component configured to provide run-time type verification.

10. A method, executed at least in part via a processing unit, comprising:
    providing a delegate connected to a software platform via a first interface and connected to a process via a second interface, the software platform comprising at least one of an operating system or a web browsing platform;
    maintaining a first independent reference count of the first interface based upon a first connection between the software platform and the first interface, the delegate configured to receive event data from the software platform via the first interface;
    maintaining a second independent reference count of the second interface based upon a second connection between the process and the second interface; and
    destroying the delegate when both the first independent reference count indicates the software platform released the first connection to the first interface and the second independent reference count indicates the process released the second connection to the second interface.

11. The method of claim 10, the software platform comprising the web browsing platform.

12. The method of claim 10, the event data wrapped in a component object model (COM) object.

13. The method of claim 10, comprising:
    notifying a function specified by the process of the event data via the second interface.

14. The method of claim 13, comprising:
    notifying the function using a pointer from the delegate to the process.

15. The method of claim 14, comprising:
    destroying the pointer when the process releases the second connection to the second interface.

16. The method of claim 13, comprising:
    supporting registration of one or more versions of the function; and
    selecting the second interface based upon the registration.

17. The method of claim 10, comprising:
    providing run-time type verification.

18. The method of claim 10, comprising:
    retaining the delegate in memory when the first connection exists and the second connection is released.

19. The method of claim 10, comprising:
retaining the delegate in memory when the first connection is released and the second connection exists.

20. A computer readable storage device comprising computer executable instructions that when executed via a processing unit perform a method comprising:
providing a delegate connected to a software platform via a first interface and connected to a process via a second interface, the software platform comprising at least one of an operating system or a web browsing platform;
maintaining a first independent reference count of the first interface based upon a first connection between the software platform and the first interface;
maintaining a second independent reference count of the second interface based upon a second connection between the process and the second interface; and
destroying the delegate when both the first independent reference count indicates the software platform released the first connection to the first interface and the second independent reference count indicates the process released the second connection to the second interface.

\* \* \* \* \*